March 31, 1931.    L. A. LAURSEN    1,798,210
MANUFACTURE OF PNEUMATIC TIRES
Filed June 27, 1927    2 Sheets-Sheet 1
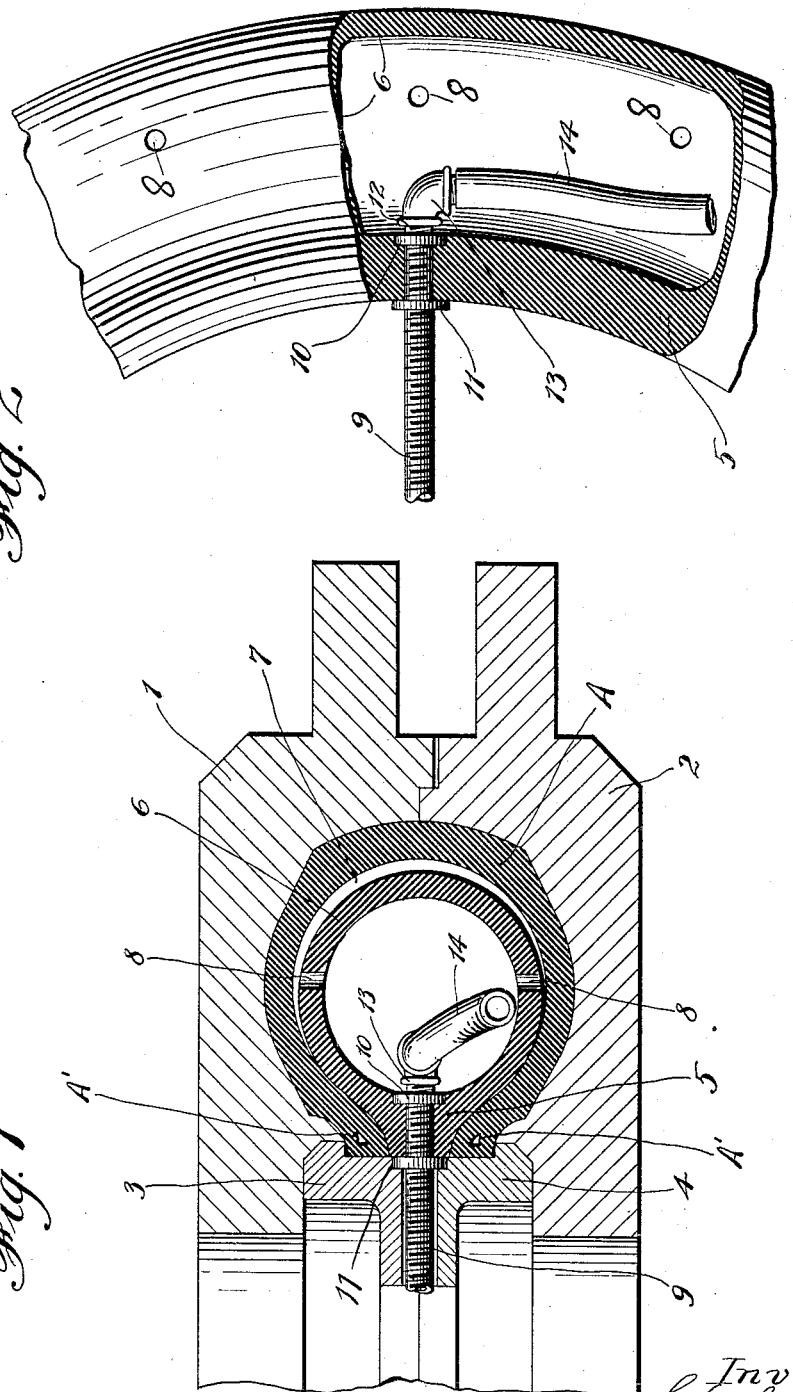

March 31, 1931. L. A. LAURSEN 1,798,210
MANUFACTURE OF PNEUMATIC TIRES
Filed June 27, 1927 2 Sheets-Sheet 2
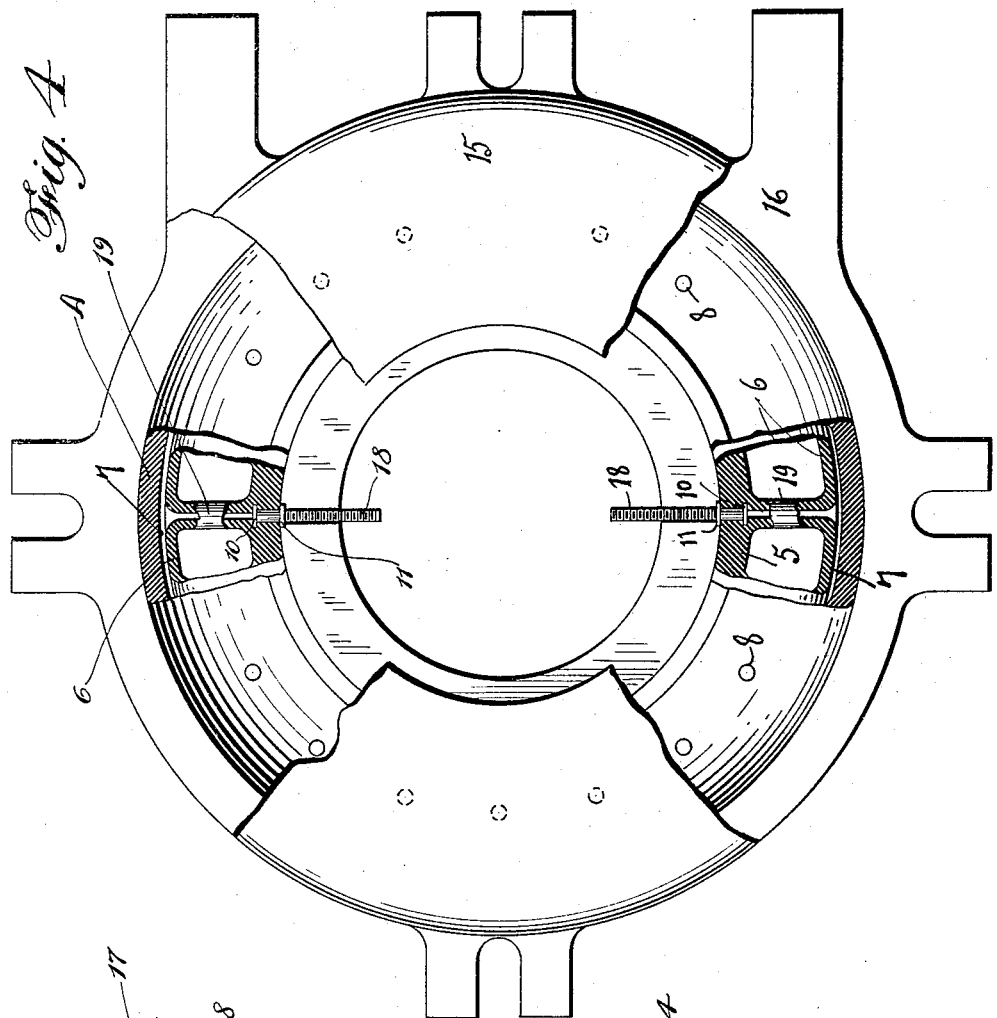
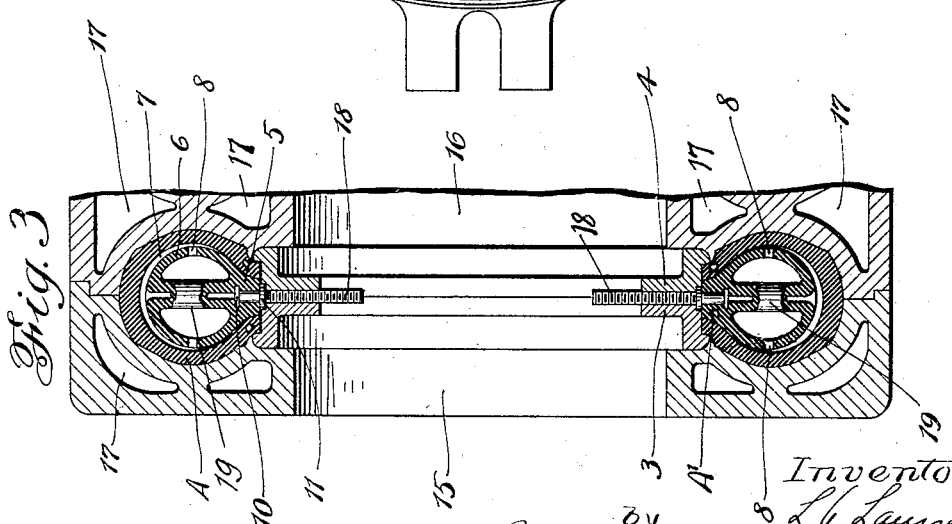
Inventor
L. A. Laursen
by
Roger, Kennedy & Campbell Attorneys Patented Mar. 31, 1931

1,798,210

UNITED STATES PATENT OFFICE

LAURITS A. LAURSEN, OF AKRON, OHIO, ASSIGNOR OF ONE-FOURTH TO PEARL FISHER LAURSEN, OF AKRON, OHIO

MANUFACTURE OF PNEUMATIC TIRES

Application filed June 27, 1927. Serial No. 201,903.

This invention relates to the manufacture of pneumatic tires or tire casings, and, while capable of more general application, it is especially adapted for use in connection with the process and apparatus disclosed in my co-pending application Serial No. 166,056, filed February 5, 1927, to which reference may be had for more detailed information.

In my said prior application, the tire casings are vulcanized in suitable molds under the influence of heat applied to the casings both internally and externally, the internal heating being effected by admitting water at the proper temperature into the interior of the casings for direct contact therewith, and the external heating being effected by applying steam pressure heat to the molds in which the casings are enclosed, as by placing a number of molds in the customary vertical vulcanizer or pot heater into which steam pressure is admitted, or by employing individual vulcanizing units, such as are commonly known in the trade as "book type vulcanizers" or "watch case heaters", in which the molds are provided with outside steam chambers or jackets. In the employment of the individual vulcanizing units, the water is usually heated to the normal curing temperature corresponding to the temperature of the steam in the surrounding heating jackets, the water in such case being circulated continuously through the sealed casings and thus maintained at a substantially uniform temperature throughout the vulcanizing period. In the employment of the pot heaters, on the other hand, the water, while it might be, is not ordinarily circulated through the casings and hence in such case it is preferably heated to a temperature somewhat above (e. g. 10° F. above) that of the steam admitted into the heaters, so as to compensate for the loss of heat which unavoidably takes place as the water comes in contact with the cold surfaces of the casing and the sealing ring, the water thereafter being maintained substantially at the normal curing temperature.

One of the features of the present invention consists in controlling the heating periods and temperatures of the two sources of heat so that the vulcanization of the inside and outside portions of the raw casings may be varied to meet the different conditions encountered in practice. As is well known, the inner or carcass portion of a tire casing is ordinarily composed of rubber stock which cures much more rapidly than does the stock which composes the outer cover or tread portion, and while this condition is eminently suited for the vulcanization of the tire casing according to the regular practice of heating from the outside only, it presents difficulties when the casing is to be vulcanized, as herein, by heat applied both externally and internally. Similar difficulties arise for other reasons, as for instance when it becomes desirable or necessary to vary the cures of the different portions of the casing in order to prevent ply separation or tread separation. Tread separation is frequently caused by an over-curing of the carcass portion relatively to the tread portion or the rubber cushion which separates the two, and heretofore it has been difficult to meet this condition except by changing the compounds in order to produce the required balancing effect.

According to my present invention, I propose to vary the heating period and the temperature of the water admitted into the raw or unvulcanized casings relatively to the heating period and temperature of the outside steam pressure heat in such manner that the inside vulcanization of the casing may be so controlled relatively to the outside vulcanization as to give the desired effect. Ordinarily, there will be no need of altering the outside steam pressure, which may therefore be fixed to produce the normal vulcanizing temperature. Ordinarily, too, the water may be maintained at the normal vulcanizing temperature, although in some cases it may be desired to raise or lower the temperature.

Assuming the water to be at normal vulcanizing temperature and it is desired to vulcanize a casing composed of a carcass which cures more rapidly than the tread (which is the usual condition), the requisite effect may be obtained by draining the water from the casing before the whole casing is completely cured, the time of drainage depending upon the different periods required to produce a uniform vulcanization of the two portions under the same temperature heat. In this way, the inside cure is arrested without arresting the outside cure, so that the inner and outer portions of the casing may be vulcanized to whatever different extents may be necessary to give a substantially uniform cure throughout the whole casing. Somewhat the same effect may be produced by lowering the temperature of the water and draining it off at a later period, although the feasibility of this alternative step will depend largely upon the nature of the rubber compounds and the length of the period which it is desired, for reasons subsequently to appear, to allow for completing the vulcanization of the casing after the water has been drained therefrom. This limitation as to the temperature of the water would apply particularly in a case where the carcass and tread portions require nearly the same period of heating; in fact, in such case it may become necessary to maintain the temperature of the water above the normal curing temperature or that of the outside steam pressure so as to complete the inside vulcanization far enough ahead of the outside vulcanization to allow the water to be drained from the casing before the whole cure is finished. Owing to its extreme flexibility, my improved process is well adapted to meet these and other varying conditions, it being possible, as above stated, to vary the heating period and the temperature of the water as desired independently of the heating period and temperature of the outside steam pressure.

Another feature of my present invention consists in eliminating moisture from the finished vulcanized casings. In the practice of my former process, it has been found that the tire casings during vulcanization absorb considerable moisture, as much in some cases as two or three pounds and even more, and while this moisture absorption is an important and advantageous factor in promoting vulcanization, retention of the water in the finished vulcanized product would serve no useful purpose and might, in fact, prove to be objectionable. In order to get rid of the moisture thus absorbed, I make use of the same step above described in controlling the vulcanization of the inside of the casing, that is to say, I drain the water from the casing before it is completely cured, the continued heating of the casing by the outside steam pressure driving the moisture out through the inside which is open to the atmosphere. The time required to expel the moisture in this manner will depend largely upon the size of the casing undergoing vulcanization or the number of plies comprising the carcass. For instance, a six-ply tire need only be left in the hot mold for a relatively short period, say six minutes or so, whereas a ten-ply or twelve-ply tire would require ten or fifteen minutes or more. It is this drying out period which is referred to above as limiting the time that may be selected for draining off the water in controlling the inside vulcanization of the casing. However, it is plain that this limitation need only be considered when the carcass and tread portions require approximately the same cure or heating period, as obviously when the carcass portion cures much more rapidly than the tread portion, the drainage of the water from the casing in controlling the inside vulcanization will almost certainly take place far enough ahead of the final cure to provide ample time for expelling the moisture from the casing. In any case, however, the two conditions may be easily met by properly controlling the heating period and the temperature of the water, so that whatever period is allowed for drainage will be sufficient to complete the outside cure by the continued application of the steam pressure heat during or after the drainage period. Consequently, as it is the aim of my invention, the continued application of the outside heat not only serves to complete the vulcanization of the outer portion of the casing, but also to drive out any moisture absorbed by the casing during vulcanization, leaving it in a perfectly dry condition when taken from the mold. In some cases, it may be desirable to use a faster curing tread stock than is generally employed so that the water may be kept within the casing throughout the greater part of the vulcanizing period.

As an aid in performing the improved steps above noted, I also propose to employ a modified form of sealing ring to close the interior cavity of the tire casing. In my former application, the sealing ring (composed of rubber and reinforced by an encircling cord band) is made of a size and shape to fill only the space between the beads, leaving the rest of the tire cavity vacant and to be filled by the water admitted through the ring. In the use of such a sealing ring, there is danger of the tire casing collapsing in the mold when the internal pressure is relieved by the drainage of the water from the sealed casing, and while this would be true in any case, it is particularly true when the casing is vulcanized in a pot heater, wherein the steam, which is under vulcanizing temperature pressure, may enter between the mold sections and act directly upon the outside of the casing to force it inwardly. Moreover, when the tire casing is built up in flat or pulley-band form and then expanded into tire shape, it is difficult to insert the sealing ring unless the casing be held in such tire shape long enough to acquire a quasi-permanent set. Consequently, in practicing my former process, I usually employed an ordinary air bag (cold) which was left in the green casing for a definite period of time to produce the desired set and then removed for the insertion of the sealing ring.

To overcome the above difficulties, my improved sealing ring is provided with a flexible supporting form, which is designed to fit within the tire casing and maintain it at all times in the desired tire shape. As a result, in preparing the green casing for vulcanization, the sealing ring, because of the supporting form with which it is provided, may be inserted immediately into the casing and the latter placed at once in the vulcanizing mold, the supporting form acting to maintain the casing in the desired tire shape in the same way as the air bag under the old practise. Subsequently, when the hot water is drawn from the casing, the supporting form will act in a similar way to prevent the collapse of the casing when the internal pressure drops below the external pressure. While the supporting form might be variously constituted, it is preferably made of hollow tubular form with perforations to establish communication between its interior and the interior of the sealed casing, thus enabling the water to be admitted into the casing and drained from it just as if the supporting form were omitted.

In the two embodiments illustrated, the sealing ring and its supporting form are made of rubber and vulcanized together as a homogeneous whole. The supporting form conforms to the shape of the interior of the tire casing (like the ordinary air bag) but is somewhat smaller so as to leave a crescent-shaped space between the form and the inner surface of the tire casing into which the hot water may flow for direct contact with the casing when admitted into the same. Being hollow and perforated, the supporting form will also be filled with hot water, which will thus exert the same pressure both inside and outside and thereby prevent distortion, stretching, or deterioration of the form.

Inasmuch as the process and apparatus, in respects other than those above noted, are or may be the same as disclosed in my prior application above referred to, the accompanying drawings have been limited to a showing of the improved sealing rings and their supporting forms.

Fig. 1 is a cross-section of a horizontally disposed mold, such as is employed in a vertical vulcanizer or pot heater, showing a green or unvulcanized tire casing placed in the mold ready to be vulcanized, and illustrating one embodiment of the combined sealing ring and tire supporting form;

Fig. 2 is a sectional elevation, partly broken away, of the combined sealing ring and tire supporting form illustrated in Fig. 1;

Fig. 3 is a cross-section of a vertically disposed mold, such as is used in an individual vulcanizing unit, showing a green or unvulcanized tire casing placed in the mold ready to be vulcanized, and illustrating a second embodiment of the combined sealing ring and tire supporting form; and Fig. 4 is a section taken on the line 4—4 of Fig. 3.

Referring first to Figs. 1 and 2, the vulcanizing mold therein shown is of standard construction and comprises top and bottom sections 1 and 2 formed with a suitable cavity which determines the final size and shape of the vulcanized casing. The mold is shown as enclosing a green or unvulcanized tire casing A which, it may be observed, is made to fill the mold cavity so that there will be no stretching of the cords when the casing is inflated with water. For non-skid casings, the mold sections will be formed with pockets or depressions to give the particular tread design desired, but these depressions have been omitted from the drawings for the sake of clearness. The casing is mounted, as usual, upon a pair of bead rings 3 and 4 fastened together by bolts or other securing means (not shown) and constituting in effect a curing rim which, when placed in the mold, forms a part thereof and which is formed with seats for the beads $A^1$ of the casing.

The interior of the green or unvulcanized casing is closed by a sealing ring 5 which fits snugly in the space between the beads and serves to clamp them tightly to their seats in the mold when the latter is closed under pressure. In this instance, the sealing ring is provided with a hollow tubular supporting form 6, which is almost but not quite as large as the interior of the tire casing, so as to leave a crescent-shaped space 7 between the form and the inner face of the casing and extending across the latter from one side to the other between points located at or near the bead zones. Both the sealing ring and its supporting form are preferably made of rubber and vulcanized together as a single flexible structure conforming in shape to the ordinary air bag. Incidentally, while other stocks are available, the compounded stock usually employed for air bags may be used in making up the combined sealing ring and supporting form. At its opposite sides, the supporting form 6 is provided with series of perforations 8 to establish communication between its interior and the crescent-shaped space 7. As shown, the sealing ring 5 is also provided with a fluid-conducting pipe 9, which corresponds to the customary valve stem of the ordinary air bag, and which is vulcanized in place in the same way. The pipe extends centrally and radially through the sealing ring and is provided with the usual fixed collar 10 and nut 11 by means of which it is clamped securely and in a fluid-tight manner to the sealing ring. At its outer end (i. e., the end located outside of the mold), the pipe 9 is threaded as usual for connection with the exterior piping. However, and in contradistinction to the ordinary valve stem, the pipe 9 is provided at its inner end (i. e., the end located within the tire supporting form) with a threaded extension 12 fitted with an L-shaped nipple 13 which extends in the direction of the circumference of the ring and lies within the circumferential plane thereof; and there is attached to said nipple a flexible hose section 14 (of rubber or any other suitable material) which rests at its free end upon the bottom side of the tire supporting form at its lowermost point.

The advantages of the above-described combined sealing ring and tire supporting form will now be clear. In preparing the green tire casing for vulcanization, it is first given the desired shape, which may be done by building it to tire shape upon an iron core or by building it in flat or pulley-band form and then expanding it into the approximate tire shape. After the casing has been thus shaped, the combined sealing ring and supporting form, being flexible and readily deformable, may be easily inserted in the casing and the bead rings 3 and 4 then applied by a rimming press in the usual manner, the supporting form after its insertion in the casing resuming its tire shape and serving during the rimming operation to maintain the casing in the desired tire shape and enabling the sealing ring to be clamped in proper position between the beads. The supporting form will function in like manner when the bead seats are formed directly in the mold sections rather than upon a separate curing rim. After the sealing ring has been clamped in place between the beads, either by the application of the bead rings or by the closing of the mold sections when the latter are formed directly with the bead seats, the tire casing is placed in the mold and is ready for vulcanization. As the hot water is admitted into the sealed casing, it will pass from the flexible hose section 14 into the interior of the supporting form 6 and out through the perforations 8 into the crescent-shaped space 7, before alluded to, for direct contact with the inner surface of the casing, filling both of said spaces and pressing the casing firmly against the mold walls. Due to its tendency to return to pulley-band form, the casing when first placed in the mold may hug the outer periphery of the supporting form 6, but the water in issuing through the perforations 8 will act almost instantly to strip the casing from the form and, in bulging it out against the mold walls, create the crescent-shaped space 7 as intended. Since the pressure of the water will be the same both inside and outside of the supporting form, no distortion or stretching thereof can take place and the action of the water in molding and vulcanizing the tire will be the same as if the supporting form were omitted. When the water is later withdrawn from the casing, it will pass out through the flexible hose section 14 which, being located at the lowermost point within the supporting form, will ensure complete drainage, the water flowing from the crescent-shaped space 7 through the perforations 8 into the interior of the supporting form and thence out through the hose section. When the pressure within the sealed casing is relieved by the drainage of the water therefrom, any tendency of the casing to collapse will be resisted and overcome by the supporting form 6, which possesses sufficient rigidity to subserve this function.

The supporting form 6 thus acts at all times to maintain the tire casing in the proper shape, functioning before vulcanization to hold the green casing in such shape to facilitate the rimming or bead seating operations, and functioning after vulcanization to prevent the vulcanized casing from collapsing within the mold after the drainage of the water therefrom. To perform these functions, it is obvious that the supporting form might take a variety of different shapes or configurations, so long as it is capable of maintaining the casing in tire shape and at the same time provide for the handling of the water and the fluids in the required manner. It hardly needs to be stated that the combined sealing ring and supporting form may be as easily removed from the vulcanized casing as it was inserted in the unvulcanized casing.

The steps of admitting and draining the water into and from the sealed casing, as well as the step of expelling air trapped within the casing, are the same as set forth in my prior application and need no further description herein. Suffice it to say that the flexible hose section 14 serves alone for the evacuation of the air trapped within the casing and for the admission and drainage of the water into and from the same. As before intimated, in this instance the water will ordinarily be admitted into the casing at a temperature above the normal curing temperature, for the reasons previously pointed out, and preferably under a high pressure, say, 150 lbs. per square inch.

Referring now to Figs. 3 and 4, which illustrate an installation suitable for an individual vulcanizing unit, the mold sections 15 and 16 are arranged upright or vertically, one being fixed and the other hinged so that the two may be closed together under pressure or swung apart as required; and each mold section is jacketed or chambered to provide heating spaces 17 into which steam or some other heating medium is admitted to vulcanize the casing from the outside. The green or unvulcanized casing A, shown as filling the mold cavity, is mounted upon bead rings 3 and 4, as in the embodiment first described. The sealing ring 5 and supporting form 6 are also substantially the same as before described, except that in this instance the combined structure is provided with two diametrically opposite fluid-conducting passages located at the highest and lowest points within the tire cavity. These two fluid-conducting passages are identical, each being made up in part of a pipe stem 18 vulcanized and clamped to the sealing ring in the same way as the pipe stem 9 of the first embodiment, and in part of a rubber tube or thimble 19 extending through the hollow perforated supporting form 6 and forming a continuation of the pipe stem 18. These rubber tubes or thimbles 19, being made of rubber, are vulcanized as an integral portion of the whole structure and may be easily produced by means of detachable pins which are withdrawn after the structure has been vulcanized.

The steps of expelling the air trapped within the casing as well as admitting the water into and draining it from the casing are also set forth in full in my prior application and need not be set forth in detail herein, although it may be stated that the water is admitted into and drained from the casing through the lower fluid-conducting passage while the air is expelled through the upper fluid-conducting passage. In this instance, the water is circulated continuously through the sealed casing during the vulcanized period, entering by way of the lower fluid-conducting pipe and leaving by way of the upper fluid-conducting pipe, being maintained at the normal or any other desired curing temperature but under a much higher pressure during circulation.

The present invention is, of course, susceptible of many modifications and variations both as regards the method and the apparatus without departing from its spirit, and while, as before stated, it is particularly useful in connection with the process and apparatus disclosed in my prior application, it is equally applicable to other processes and apparatuses which employ internal hydraulic pressure during vulcanization. Such modifications and variations will readily suggest themselves to those skilled in the art and it is therefore to be understood that the invention is not limited to any particular procedure except in so far as such limitations are specified in the claims.

Having thus described my invention, what I claim is:

1. An improvement in the process of vulcanizing a tire casing, which consists in vulcanizing the green or raw casing from the outside by the application of a desired vulcanizing heat for a given period of time, and in vulcanizing it from the inside for a shorter period of time under the direct action of water heated to a desired vulcanizing temperature and under a pressure in excess of the vulcanizing temperature pressure.

2. An improvement in the process of vulcanizing a tire casing, which consists in vulcanizing the green or raw casing from the outside by the application of a desired vulcanizing heat for a given period of time, and in vulcanizing it from the inside for a shorter period of time under the direct action of water heated to a higher vulcanizing temperature and under pressure in excess of said higher vulcanizing temperature pressure.

3. The process of vulcanizing a tire casing, which consists in placing the green or unvulcanized casing in a suitable vulcanizing mold, sealing the interior of the casing, admitting water heated to a desired temperature into the sealed casing for direct contact therewith to vulcanize it from the inside, applying heat to the mold to vulcanize the casing from the outside, and draining the water from the casing before the close of the mold heating period; whereby the vulcanization of the tire casing at its inner and outer sides may be controlled as desired.

4. The process of vulcanizing a tire casing, which consists in placing the green or unvulcanized casing in a suitable vulcanizing mold, sealing the interior of the casing, admitting water heated to a desired temperature into the sealed casing for direct contact therewith to vulcanize it from the inside, applying heat to the mold to vulcanize the casing from the outside, and draining the water from the casing at a selected time while continuing the application of heat to the mold, whereby the inside cure of the casing may be arrested when desired without arresting the outside cure.

5. The process of vulcanizing a tire casing, which consists in placing the green or unvulcanized casing in a suitable vulcanizing mold, sealing the interior of the casing, admitting water heated to a desired temperature into the sealed casing to vulcanize it from the inside, applying heat to the mold to vulcanize the casing from the outside, draining the water from the tire casing after it has been sufficiently vulcanized inside, and continuing the application of heat to the mold after the water has been drained from the casing for a period long enough to complete the outside cure and at the same time drive out from the inside the moisture absorbed by the casing during vulcanization.

6. The process of vulcanizing a tire casing, which consists in placing the green or unvulcanized casing in a suitable vulcanizing mold, sealing the interior of the casing for direct contact therewith, admitting hot water into the sealed casing to vulcanize it from the inside, applying steam pressure heat to the mold to vulcanize the casing from the outside, draining the water from the casing while continuing the application of the outside steam pressure, and preventing the collapse of the casing upon relief of the inside pressure due to the water drainage.

In testimony whereof, I have affixed my signature hereto.

LAURITS A. LAURSEN.

CERTIFICATE OF CORRECTION.

Patent No. 1,798,210.                          Granted March 31, 1931, to

LAURITS A. LAURSEN.

It is hereby certified that error appears in the printed specification of the above numbered patent requiring correction as follows: Page 5, line 35, for "vulcanized" read vulcanizing; same page, lines 125 and 126, claim 6, strike out the phrase "for direct contact therewith" and insert the same to follow the word "casing" in line 127; and that the said Letters Patent should be read with these corrections therein that the same may conform to the record of the case in the Patent Office.

Signed and sealed this 14th day of July, A. D. 1931.

(Seal)                                                                    M. J. Moore,
Acting Commissioner of Patents.